A. L. WILLEY & A. C. MASON.
DRAWING FRAME.
APPLICATION FILED JAN. 6, 1912.
1,090,586.
Patented Mar. 17, 1914.
6 SHEETS—SHEET 5.
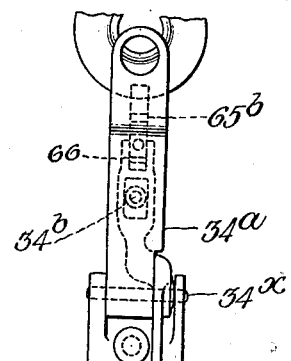
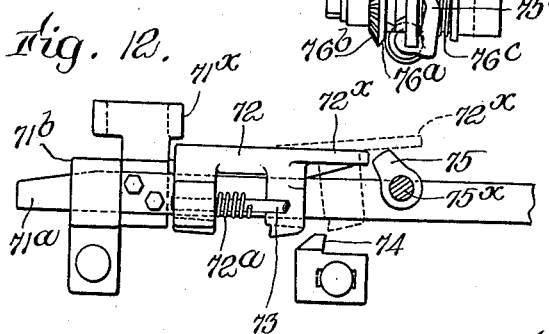
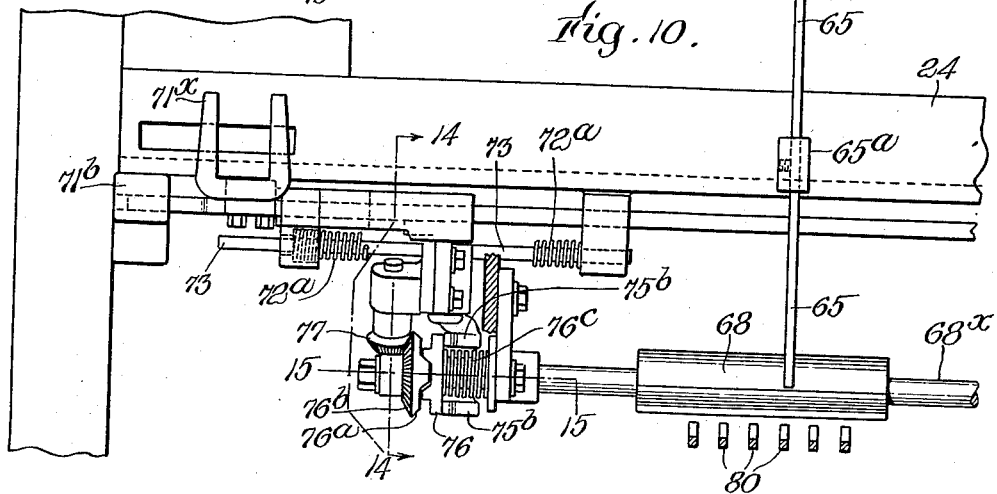
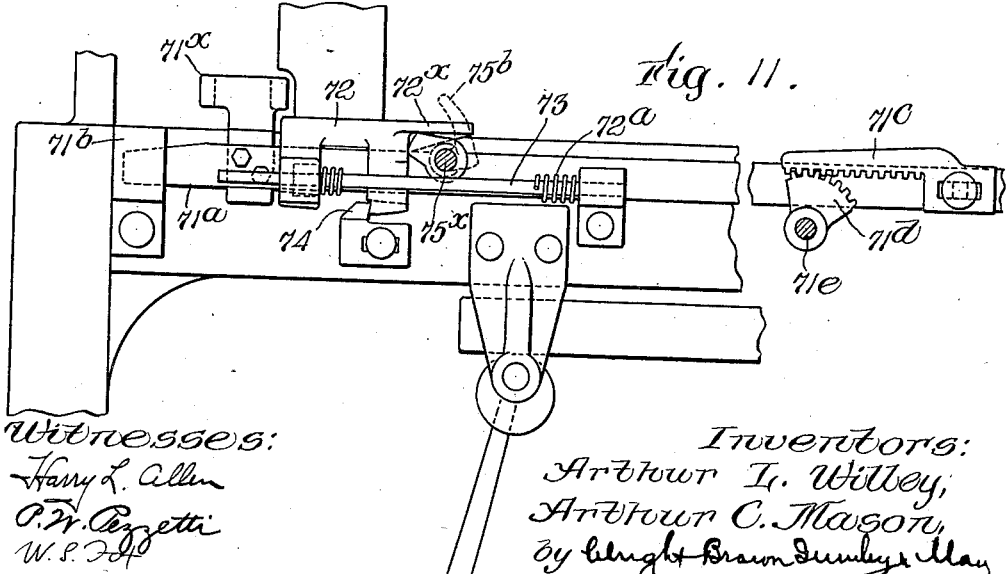

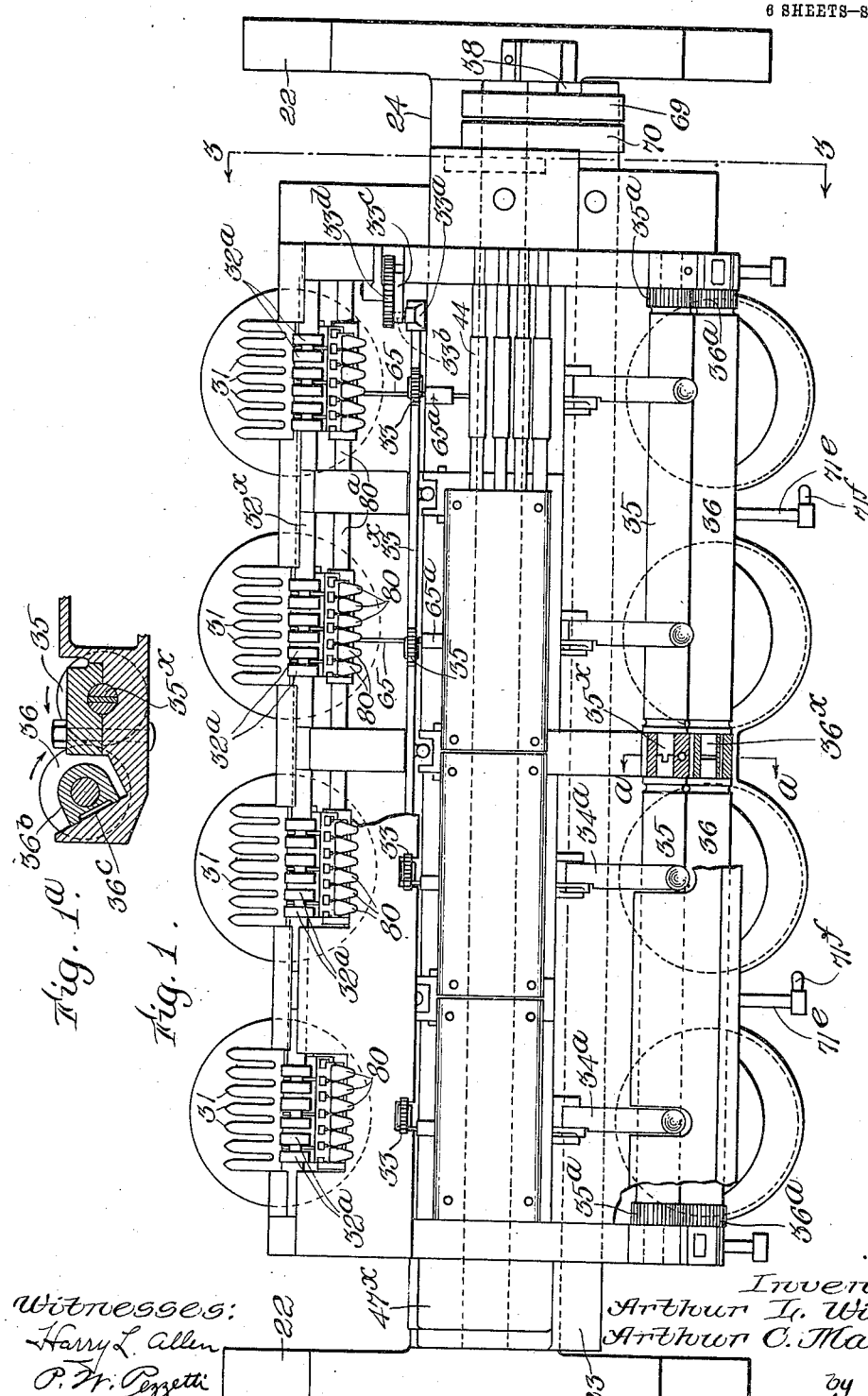

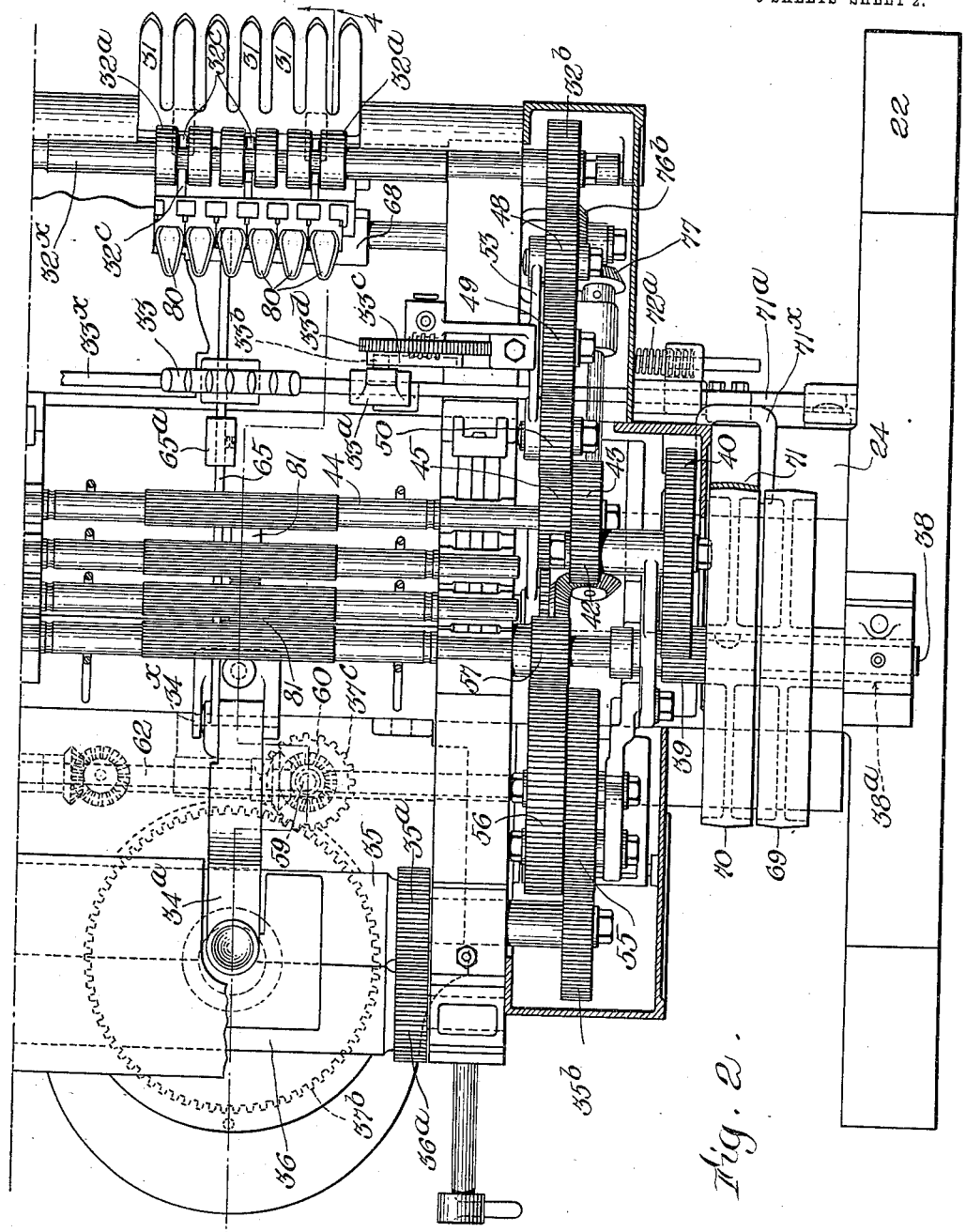

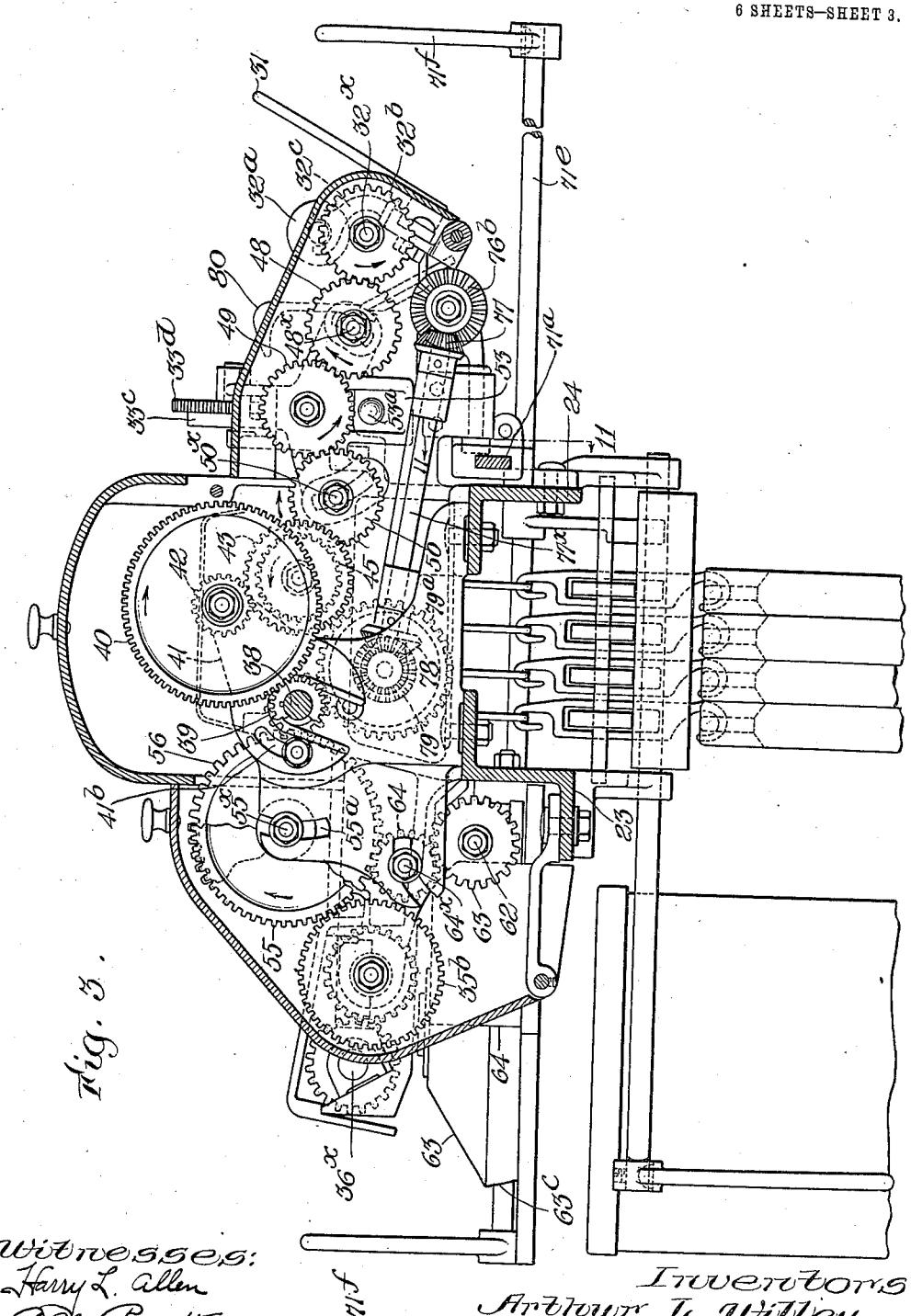

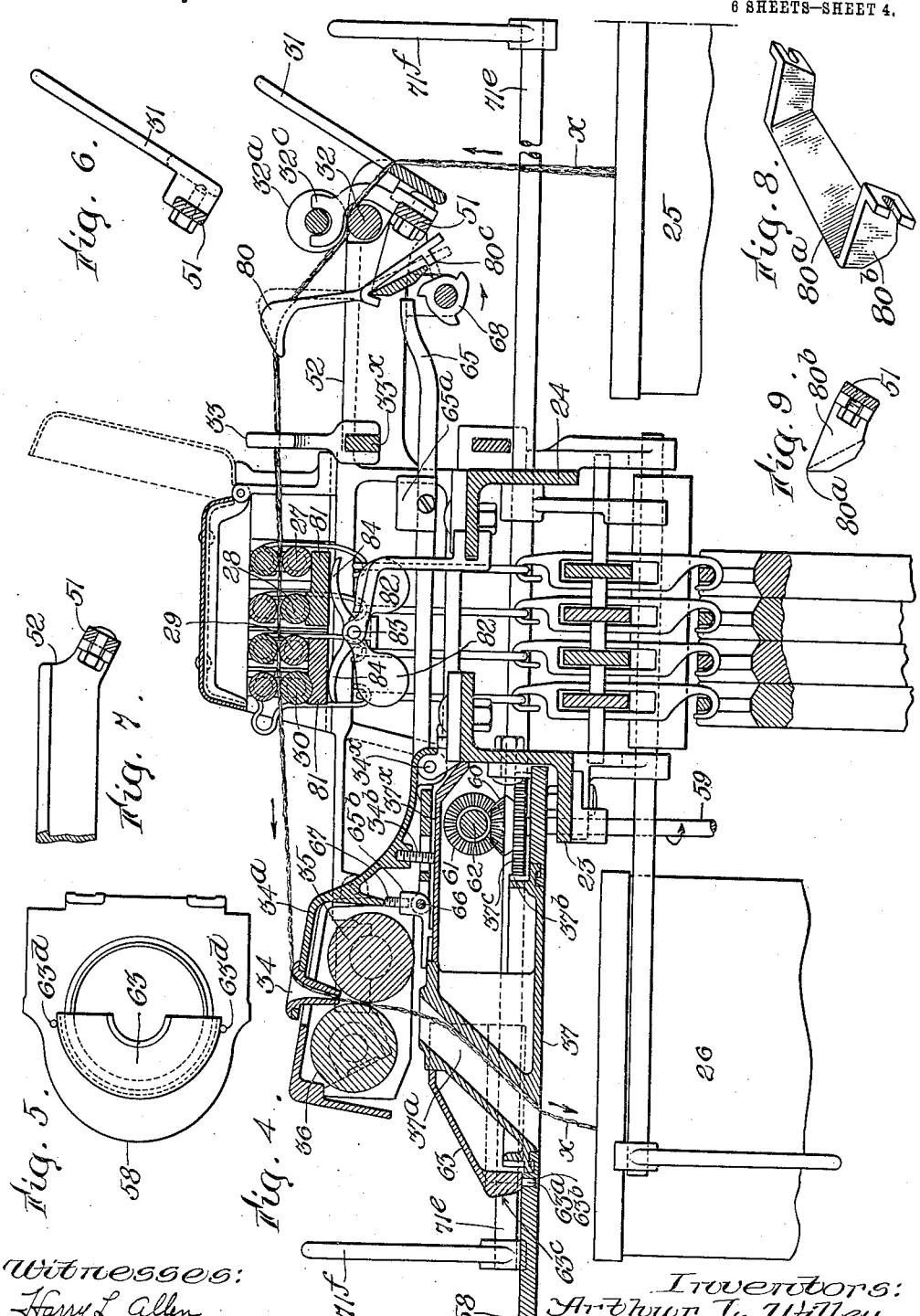

A. L. WILLEY & A. C. MASON.
DRAWING FRAME.
APPLICATION FILED JAN. 6, 1912.
1,090,586.
Patented Mar. 17, 1914.
6 SHEETS—SHEET 6.
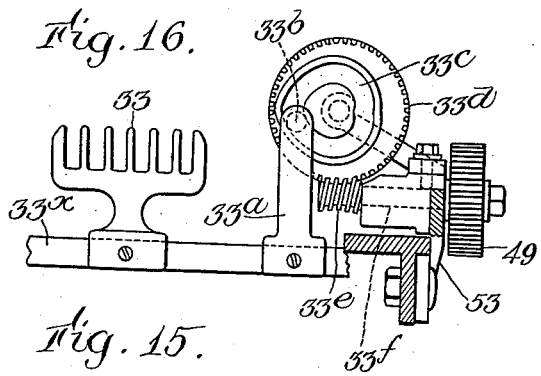
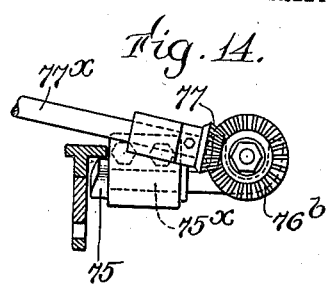
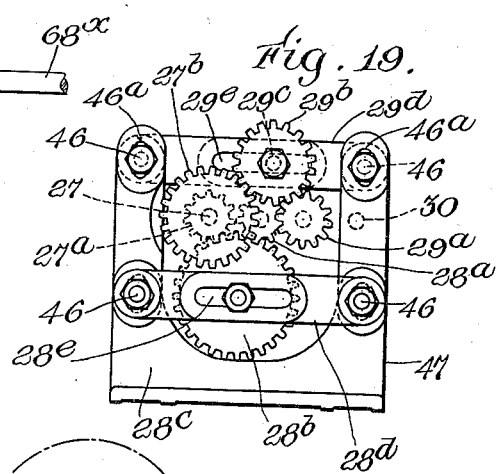
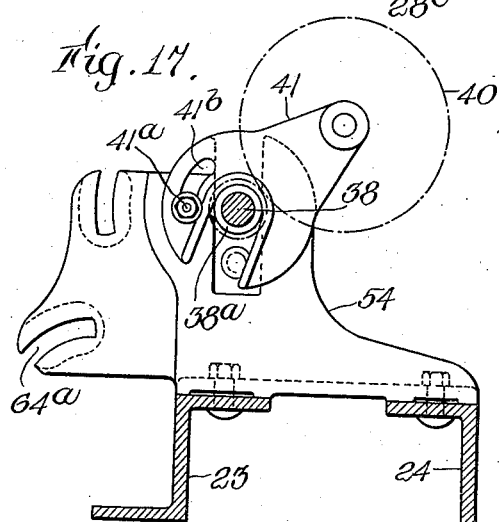
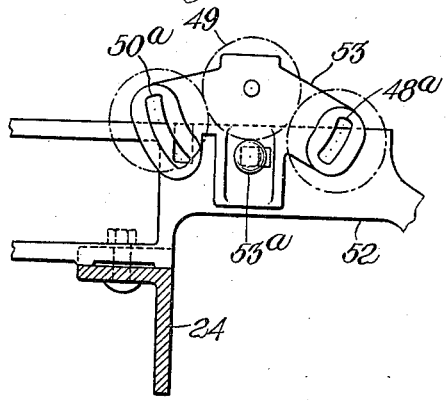

UNITED STATES PATENT OFFICE.

ARTHUR L. WILLEY, OF PROVIDENCE, RHODE ISLAND, AND ARTHUR C. MASON, OF YONKERS, NEW YORK, ASSIGNORS TO WOONSOCKET MACHINE & PRESS COMPANY, OF WOONSOCKET, RHODE ISLAND, A CORPORATION OF RHODE ISLAND.

DRAWING-FRAME.

1,090,586.

Specification of Letters Patent. Patented Mar. 17, 1914.

Application filed January 6, 1912. Serial No. 669,832.

*To all whom it may concern:*

Be it known that we, ARTHUR L. WILLEY and ARTHUR C. MASON, citizens of the United States, and residents, respectively, of Providence, county of Providence, State of Rhode Island, and Yonkers, in the county of Westchester and State of New York, have invented certain new and useful Improvements in Drawing-Frames, of which the following is a specification.

This invention relates to that class of textile machinery known as drawing frames. A machine of this type is employed to parallelize the fiber prior to twisting the sliver, the sliver being in a comparatively loose state before being operated upon by the drawing mechanism.

A drawing frame combines a number of relatively loose slivers to form a single sliver of more compact formation, and it is customary to take the loose slivers from cans in which they have been coiled and deliver them into similar cans by suitable coiling mechanism.

Drawing frames are usually provided with stop mechanism adapted to be operated when the receiving can or cans are filled or when a sliver breaks. One of the features of the present invention relates to such stopping mechanism.

Another feature of the present invention relates to the clearers which engage the drawing rolls to prevent the silver from becoming entangled in the rolls in case of breakage.

Other features of the invention relate to the construction of various mechanisms which do not depend, in the present instance, upon any new principle of operation but which embody improvements in construction whereby the operation of the machine is improved and whereby the cost of manufacture and assembling is reduced.

Of the accompanying drawings: Figure 1 represents a top plan view, partly broken away, of a drawing frame embodying the various features of the present invention. Fig. 1ª represents a vertical cross section at a point indicated by line *a—a* of Fig. 1. Fig. 2 represents a top plan view, partly broken away, of one end of the drawing frame, including the main driving mechanism and one of the units for combining and drawing a number of slivers to form one sliver. Fig. 3 represents a vertical cross section as indicated by line 3—3 on Fig. 1. Fig. 4 represents a vertical cross section, as indicated by line 4—4 on Fig. 2. Fig. 5 represents a top plan view of a modified form of cover for the coiler. Fig. 6 represents an elevation of a sliver guide as applied to a supporting bar. Fig. 7 represents a portion of a roll stand and a supporting bar attached thereto. Fig. 8 represents a perspective view of a supporting member for the tilting spoons which operate the stop mechanism when the sliver breaks. Fig. 9 represents an end view of the same supporting member as attached to a supporting bar. Fig. 10 represents a top plan view, partly in section, of the stop mechanism. Fig. 11 represents an elevation, partly in section, of the same stop mechanism. Fig. 12 represents an elevation, similar to Fig. 11, of a portion of the stop mechanism in a different position. Fig. 13 represents an elevation, partly in section, of another portion of the stop mechanism. Fig. 14 represents an elevation, partly in section, indicated by line 14—14 on Fig. 10. Fig. 15 represents a vertical section indicated by line 15—15 on Fig. 10. Fig. 16 represents a rear elevation, partly in section, of a portion of the traverse mechanism. Fig. 17 represents an elevation of one of the gear frames as applied to the main frame of the machine. Fig. 18 represents an elevation of another gear frame as applied to the main frame of the machine. Fig. 19 represents an elevation of a frame for supporting the gears which drive the drawing rolls at different speeds.

The same reference characters indicate the same parts wherever they occur.

Referring first to Fig. 1, the frame members which rest upon the floor are indicated at 22. These members are connected by bars 23 and 24 of angular cross section which support the mechanism hereinafter described. In Fig. 4 a sliver is indicated at *x*. A number of slivers are taken from cans at 25 and after being passed through drawing rolls are combined and delivered by a coiler into a can at 26. In this embodiment of the invention provisions are made for delivering four slivers from four groups of slivers including six in each group.

The drawing rolls are indicated at 27, 28, 29 and 30. The rolls 27 are driven at a relatively slow speed, the rolls 28 at a faster speed, the rolls 29 at a speed faster than the rolls 28, and the rolls 30 at a speed faster than the others. The several slivers taken from a group of cans 25 pass through fixed guides 31 and between feed rolls 32, 32ª, and thence through laterally movable traverse guides 33 to the drawing rolls. All the slivers of the group become combined in passing through the drawing rolls, and pass in the form of a single sliver to the trumpet 34. From the trumpet the sliver passes between cylinder rolls 35 and 36, and thence through the tube 37ª of a coiler 37 by which it is coiled in the can 26.

The mechanism for driving the drawing rolls is shown by Figs. 2, 3 and 19. The main power shaft of the machine is indicated at 38. This shaft extends the entire length of the machine from one of the frame members 22 to the other of said members, and is formed at suitable intervals with fluted portions hereinbefore referred to as the fast-speed drawing rolls. As shown by Figs. 2 and 3, a pinion 39 affixed to the shaft 38 drives a gear 40. This gear is mounted upon an adjustable bracket 41, hereinafter described, and is compounded with a pinion 42. The pinion drives a gear 43 which is affixed to the shaft 44 of the slow-speed drawing rolls 27. The gear 43 is compounded with a gear 45 which drives other mechanism hereinafter described.

The shafts of the fast and slow drawing rolls extend to the opposite end of the frame, where the slow shaft is provided with gears, shown by Fig. 19, for driving intermediate drawing rolls. The gears for this purpose are inclosed by a gear case indicated at 47ˣ in Fig. 1. A pinion 28ª, affixed to the first intermediate roll 28, is driven by a pinion 27ª through the medium of an idle gear 28ᵇ. The pinion 27ª is affixed to the shaft of the slow rolls. A pinion 29ª affixed to the shaft of the second intermediate rolls is driven by a gear 27ᵇ through the medium of an idle gear 29ᵇ. The gear 27ᵇ is also affixed to the shaft of the slow rolls. The idle gears 28ᵇ and 29ᵇ are mounted upon studs indicated respectively at 28ᶜ and 29ᶜ, which studs are supported by adjustable bars 28ᵇ and 29ᵈ. The bars are formed with slots 28ᵉ and 29ᵉ for the reception of the studs, and may be adjusted to provide for a change of gears when a change in the relative speeds of the rolls is required. The bars 28ᵈ and 29ᵈ are secured by bolts 46 to a frame or head 47. The frame is formed with slots 46ª for the reception of the bolts, whereby the bars may be adjusted to the desired positions.

The feed rolls 32 are formed upon a continuous shaft 32ˣ. A gear 32ᵇ affixed to one end of the shaft is driven by a train of gears including those indicated at 48, 49, 50 and 45. The rolls 32ª are loosely mounted upon the rolls 32 and are held in position by brackets 32ᶜ. Each roll 32ª is formed with two portions of large diameter for engaging the slivers, which portions are connected by a neck and adapted to be disposed one on either side of a bracket 32ᶜ, as shown by Figs. 2 and 4. The brackets are formed so that the rolls may be detached by simply lifting them from the rolls 32. The brackets 32ᶜ are affixed to a longitudinal supporting bar 51 which is affixed, as shown by Fig. 7, to the roll stands 52. The bar 51 also supports the fixed sliver guides 31 and other devices hereinafter explained.

The transverse guides 33 are affixed to a traverse bar 33ˣ which is reciprocated longitudinally by mechanism shown in Figs. 2 and 16. One end of the traverse bar is provided with an arm 33ª which carries a cam roll 33ᵇ. The cam roll occupies a cam groove 33ᶜ in a cam disk the periphery of which is in the form of a worm gear 33ᵈ. This gear is driven by a worm 33ᵉ on a shaft 33ᶠ to which is affixed the gear 49 hereinbefore mentioned.

The gears 48 and 50 which are included in the train of gears for driving the feed rolls, and the traverse guides, are adjustably mounted in a gear frame 53. (See Figs. 3 and 18). The stud 48ˣ which supports the gear 48 is adjustable in a slot 48ª formed in the gear frame. This slot is concentric with relation to the axis of the gear 49 and provided for a change in the size of the gear 32ᵇ for varying the speed of the feed rolls. The stud 50ˣ which supports the gear 50 is similarly adjustable in a slot 50ª formed in the gear frame. This slot is likewise concentric with relation to the axis of the gear 49 and provides for a change in the size of the gear 45, whereby the speed of the traverse guides, as well as the speed of the feed rolls, may be varied. The gear frame 53 is adjustably secured by a bolt 53ª to one of the roll stands 52.

The bracket 41 which supports the gears 40 and 42 is adjustably secured to a gear frame 54 mounted upon the angle bars 23 and 24. The purpose of making the bracket 41 adjustable is to provide for a change in the size of the gear 42, whereby the speed of the slow drawing rolls may be varied with relation to the speed of the fast drawing rolls. The bracket 41 embraces a sleeve 38ª upon the main power shaft 38. The bracket is clamped to the frame 54 by a bolt 41ª which extends through a slot 41ᵇ in the bracket. The slot is concentric with relation to the axis of the shaft 38, and the bracket is therefore adapted to preserve the driving relation of the gears 39 and 40 while being adjustable for receiving gears 42 of various sizes.

As shown by Fig. 1, each of the calender rolls 35 is adapted to act upon the slivers of two groups. There are two rolls 35 in end to end relation, as shown by Fig. 1, and they are coupled by a tongue-and-groove connection indicated at 35$^x$ whereby one may be driven by the other. The calender rolls 36 are arranged in a similar manner, but they are not coupled in the same manner. Each roll 35 is provided with a gear 35$^a$, and each roll 36 is provided with a gear 36$^a$. The gears 35$^a$ mesh with the gears 36$^a$ so that each roll 36 is driven by its coöperative roll 35. As shown by Figs. 2 and 3, one of the rolls 35 is provided with a gear 35$^b$, which gear is driven by a gear 55. The gear 55 is compounded with a gear 56, both of said gears being mounted upon a stud 55$^x$. The gear 56 is driven by a pinion 57 affixed to the main shaft 38. The stud 55$^x$ is adjustably mounted in a slot 55$^a$ formed in the gear frame 54. This slot is concentric with relation to the axis of the shaft 38, thus providing for adjustment of the stud whereby gears 35$^b$ of various sizes may be provided for varying the speed of the calender rolls.

The necessary pressure of the calender rolls against each other is effected by mounting the rolls 36 as shown by Figs. 1$^a$ and 3. The shafts 36$^x$ of these rolls are mounted in bearing members 36$^b$ which are arranged upon inclined faces 36$^c$. The weight of the rolls causes a wedging action of the members 36$^b$ upon the faces 36$^c$ and thus forces the calender rolls against each other.

The coilers 37 are rotatably mounted upon bedplates 58, the coilers and bedplates being grooved and flanged to fit into each other, as shown by Fig. 4. Gear teeth 37$^b$ formed upon the coilers coöperate with gears 37$^c$ affixed to vertical shafts 59. The shafts are provided with bevel gears 60 which are driven by bevel gears 61 affixed to a horizontal shaft 62. The shaft 62 is provided with a gear 63 (see Fig. 3) which is driven by the gear 56 through the medium of an intermediate gear 64. The stud 64$^x$ upon which the intermediate gear is mounted is adjustably secured in a slot 64$^a$ formed in the gear frame 54. (See Fig. 17). The curvature of the slot 64$^a$ is concentric with relation to the axis of the shaft 62, to provide for various positions of the stud 64$^x$ when the gears 63 and 64 are changed for similar gears of another size. The vertical shafts 59 are provided for driving the usual turntables upon which the receiving cans 26 stand. The turntables are not illustrated upon the drawings, since their operation and function are well known and form no part of the present invention.

Covers for the coilers 37 are indicated at 63. As shown by Figs. 3 and 5, these covers are semi-circular in plan view, their inner edges being adapted to lie against vertical surfaces 64 afforded by other portions of the machine. The covers 63 are made and fitted so as to be readily detachable in order to expose the interior of the coiler mechanism. As shown by Fig. 4, the cover is provided with a dowel pin 63$^a$ which is adapted to fit into a hole 63$^b$ formed in the bedplate 58. The dowel pin is sufficient to keep the inner edge of the cover snugly against the vertical surface 64 and to prevent all lateral movement of the cover. The cover may be quickly removed by lifting it so as to withdraw the dowel pin from its hole.

The hands of the operatives are usually covered with oil or grease, and for this reason it is necessary to form the cover so that the hands of the operative will not slip when grasping the cover. To prevent slipping, the rim of the cover is formed with a surface 63$^c$ which tapers downwardly. This surface, although usually polished, is sufficient to prevent the cover from slipping through the hands of the operative. Fig. 5 shows other means for holding the cover in place. In this figure the bedplate 58 is provided with upstanding pins or projections 63$^d$ which are sufficiently far apart to admit the cover between them, but which are adapted to prevent sidewise movement of the cover.

Each trumpet 34 by which the sliver is guided from the drawing rolls to the calender rolls is supported by an arm 34$^a$ pivoted at 34$^x$. The movable arm 34$^a$ forms a part of automatic stop mechanism whereby the operation of the machine is arrested whenever the sliver breaks between the drawing rolls and the calender rolls. The arm 34$^a$ is provided with an adjustable stop screw 34$^b$ which normally rests upon the coiler 37$^x$. A weighted lever 65 is provided for each trumpet arm. The several weighted levers are mounted upon the pivots 34$^x$, as clearly shown by Figs. 4 and 10. Each lever is provided with an adjustable weight 65$^a$ on one side of the fulcrum, and with a bell crank 65$^b$ on the other side of the fulcrum. The bell cranks are pivotally mounted at 66, and each is provided with an adjustable screw 67 which extends upwardly and is adapted to abut against a portion of the adjacent arm 34$^a$. A portion of the bell crank 65$^b$ is adapted to rest upon the coiler casing 37$^x$, and in this position to place the screw 67 in position to engage the trumpet arm. The weight 65$^a$ is so adjusted as to barely overbalance and lift the trumpet arm when there is no downward tension on the arm. When the weight is adjusted to the desired position, the downward pull of the sliver, acting upon the trumpet, is sufficient to hold the trumpet arm down and the weight up. Whenever the sliver breaks between the drawing rolls and the trumpet, the trumpet arm is overbalanced by the weight as soon as the end of the sliver has passed through the trumpet. The free end of the lever 65 thereupon moves into the path of a continuously driven member 68 which is provided with a plurality of faces or shoulders adapted to abut against the end of the lever. When any one of the faces of the member 68 strikes the lever 65, the rotation of the member 68 is positively stopped, thus operating mechanism, hereinafter described, for disconnecting the power from the machine.

As shown by Figs. 1 and 2, the main shaft 38 is provided with two pulleys, indicated at 69 and 70. The pulley 70 is keyed to the shaft, and the pulley 69 is loosely mounted upon the sleeve 38$^a$. The driving belt 71 (Fig. 2) is adapted to be shifted from one pulley to the other by a forked shipper 71$^x$. This shipper is affixed to a movable bar 71$^a$ (see also Figs. 10, 11 and 12). The bar is mounted in suitable guides 71$^b$ in which it is adapted to slide. A striker 72 is loosely mounted upon the shipper bar and has a portion which is adapted to slide upon a parallel rod 73. A spring 72$^a$ surrounds the rod 73 and is compressed longitudinally and arranged so that one end thereof engages the striker 72. Whenever the striker is free to be moved by the spring, it will move the shipper so as to shift the belt to the loose pulley or to hold the belt upon the loose pulley if it has already been placed thereon.

A detent 74 affixed to a part of the machine frame is adapted to engage a portion of the striker 72 to hold it in retracted position, as shown best by Fig. 11. One end of the striker is adapted to be lifted to the position represented by dotted lines in Fig. 12, and when so lifted the striker is released from the detent so that it may be thrown against the shipper by the spring 72$^a$. An extension 72$^x$ formed on the striker is adapted to be engaged and lifted by a finger 75 affixed to a rock shaft 75$^x$. This rock shaft is provided with a fork 75$^b$ which is adapted to be engaged by a clutch member 76. The member 76 coöperates with a complemental clutch member 76$^a$ which is formed with teeth 76$^b$ in the form of a bevel gear. This gear is driven by a bevel gear 77 affixed to an inclined shaft 77$^x$. A second bevel gear 78, affixed to the inclined shaft, as shown by Figs. 2 and 3, is driven by a bevel gear 79. The gear 79 is compounded with a spur gear 79$^a$ which meshes with the pinion 57 hereinbefore described.

The coöperative portions of the clutch members 76 and 76$^a$ are provided with beveled faces, as shown by Fig. 10. The member 76 is normally held against the member 76$^a$ by a spring 76$^c$. As shown by Fig. 15, the member 76$^a$ is loosely mounted upon the shaft 68$^x$ which carries the members 68, while the clutch member 76 is splined upon the said shaft so that it may move endwise thereon. Rotation is therefore transmitted from the gear 77 through the gear 76$^b$ and through the clutch members to the shaft 68$^x$. Now, therefore, whenever the rotation of the shaft 68$^x$ is arrested, as previously explained, the clutch member 76 is forced away from the clutch member 76$^a$ by the inclined coöperative faces of said members. The clutch member 76$^a$ may therefore continue to revolve independently of the member 76, but the movement thus imparted to the member 76 effects the disconnection of power, as will be explained.

As shown by Fig. 13, the member 76 is moved away from the member 76$^a$ and has rocked the shaft 75$^x$ through the medium of the fork 75$^b$. This movement of the rock shaft has turned the finger 75 from the position shown in Fig. 11 to the position shown in Fig. 12, thereby lifting the extension 72$^x$ to disengage the striker from the detent 74. As previously explained, when the striker is thus released, its spring 72$^a$ effects the transfer of the belt to the loose pulley and thus the power is disconnected. This form of stop mechanism is well known, and no claim is made for it in this application. It is shown and described at length because other controlling means hereinafter described is combined with it to effect the disconnection of the power whenever a receiving can is filled.

Referring to Fig. 4, the coiler 37 is adapted to be lifted slightly above the seat on its bedplate 58, and it becomes so lifted when the column of sliver below it has increased sufficiently. This figure also shows a laterally extending portion of the bell crank 65$^b$ overlapping a portion of the coiler. Now, therefore, a very slight upward movement of the coiler is sufficient to tilt the latch 65 about its pivot 66, thus disengaging the abutment 67 from the trumpet arm. As soon as the weighted lever 65 is thus relieved from the weight of the trumpet arm, its free end drops into engagement with the member 68 and effects the disconnection of the power, as hereinbefore explained. The latch 65$^b$ is so constructed and arranged that it will normally resume the position shown in Fig. 4 when the coiler and trumpet arm are returned to their operative positions.

A third form of controller for operating the stop motion is included in the drawings. This third controller is well known and is not claimed in this application. Briefly described, it comprises a number of members.

A number of members 80 which are termed spoons are provided one for each of the slivers passing into the drawing rolls. The spoons are arranged to engage their respective slivers between the feed rolls 32 and the traverse guide 33 so as to cause the stopping of the machine whenever one of the slivers breaks at this point. The spoons 80 are arranged in groups, as shown by Figs. 1 and 2, in accordance with the grouping of the slivers. Each group of spoons is mounted in such manner as to be free to tilt upon a sharp edge 80ᵃ afforded by a bracket 80ᵇ. The several brackets are of the form shown best by Fig. 8 and are all affixed to the supporting bar 51 in the manner shown best by Fig. 9. Each spoon 80 is provided with a stop finger 80ᶜ which is adapted to coöperate with the member 68 in the manner explained in connection with the lever 65. The weight of the spoons is so disposed that they normally seek the position represented by dotted lines in Fig. 4; but when the spoons are engaged by the slivers as shown by Fig. 4, they are held in the position represented by solid lines. In the latter position the stop fingers 80ᶜ are held out of the path of the member 68; but whenever a spoon is relieved of the weight of a sliver it immediately tilts to the position represented by dotted lines, in which position the finger 80ᶜ is adapted to arrest the rotation of the member 68 and cause the operation of the stop motion.

Fig. 11 shows manually operative means for moving the shipper bar 71ᵃ to transfer the belt to the loose pulley without disturbing any of the automatic controlling devices hereinbefore described. A rack 71ᶜ is affixed to the shipper bar and is engaged by a gear segment 71ᵈ. The gear segment is affixed to a rock shaft 71ᵉ which extends transversely of the machine (Figs. 1, 2 and 4) and is provided with operating handles 71ᶠ. This manually operative means may be used to transfer the belt to the tight pulley when starting the machine, and to retract the striker at the same time. The coöperative portions of the striker and of the detent are formed so as to lift the striker and permit it to drop behind the detent. If the shipper bar be moved manually in the opposite direction to place the belt upon the loose pulley, the striker is not disturbed but is left in engagement with the detent, as shown by Fig. 11.

The drawing rolls are provided with clearing devices 81. (See Fig. 4). These clearing devices are held upwardly against the under sides of the drawing rolls by weighted levers 82. The levers for each pair of clearing devices are mounted upon a common pivot stud 83. The fingers 84 of the levers are curved so as to facilitate the introduction of the clearing devices. This form of supporting means for the clearing devices is provided in substitution for the usual spring-tension devices hitherto employed. The weighted supports are preferable, because they cannot easily be broken nor become entangled with the adjacent parts of the machine.

We claim:

1. A drawing frame comprising a coiler, rolls for acting upon the sliver, means for driving said rolls, a movable trumpet arm, stop mechanism including a gravity stop member for disconnecting the power from said rolls, and a movable tripping device held by said trumpet arm for restraining said stop member from acting, said tripping device being arranged to be moved by upward movement of said coiler to release said stop member from said trumpet arm.

2. A drawing frame comprising a coiler, rolls for acting upon the sliver, means for driving said rolls, a movable trumpet arm, stop mechanism including a gravity stop member for disconnecting the power from said rolls, and a tilting device held by said trumpet arm for restraining said stop member from acting, said tilting member being arranged to be tilted by upward movement of said coiler to release said stop member from said trumpet arm.

3. A drawing frame comprising a coiler, rolls for acting upon the sliver, means for driving said rolls, a movable trumpet arm, stop mechanism including a gravity stop member for disconnecting the power from said rolls, and a movable device carried by said stop member for abutting against said trumpet arm to restrain said stop member from acting, said device being movable by upward movement of said coiler to release said stop member from said trumpet arm.

In testimony whereof we have affixed our signatures, in presence of two witnesses.

ARTHUR L. WILLEY.
ARTHUR C. MASON.

Witnesses:
PETER W. PEZZETTI,
WALTER P. ABELL.

Copies of this patent may be obtained for five cents each, by addressing the "Commissioner of Patents, Washington, D. C."